United States Patent [19]

Rimpi

[11] 4,187,279
[45] Feb. 5, 1980

[54] DEVICE FOR RECOVERING SODIUM CHEMICALS FROM GREEN LIQUOR AND FLUE GASES

[75] Inventor: Pertti K. Rimpi, Tampere, Finland

[73] Assignee: OY Tampella AB, Tampere, Finland

[21] Appl. No.: 938,944

[22] Filed: Sep. 1, 1978

[30] Foreign Application Priority Data

Sep. 5, 1977 [FI] Finland .................. 772626

[51] Int. Cl.² ............. B01J 10/00; C01B 17/16;
D21C 11/06; D21C 11/12
[52] U.S. Cl. .................. 422/185; 162/30 R;
162/30 K; 261/21; 422/193; 422/194; 422/172;
422/173; 422/20; 423/DIG. 3
[58] Field of Search .......... 422/168, 169, 172, 173,
422/188, 189, 191, 194, 200; 162/30 R, 30 K,
36; 261/21, 30 R; 423/DIG. 3

[56] References Cited

U.S. PATENT DOCUMENTS

| | | | |
|---|---|---|---|
| 2,800,388 | 7/1957 | Ahlborg et al. ............. | 162/36 |
| 2,841,561 | 7/1958 | Gray et al. ................. | 162/36 X |
| 2,993,753 | 7/1961 | Collins ..................... | 162/36 X |
| 3,331,733 | 7/1967 | Vencmark ................... | 162/30 R |
| 3,508,863 | 4/1970 | Kiminki et al. ............. | 162/30 R X |
| 3,615,199 | 10/1971 | Terrana ..................... | 422/191 X |
| 3,752,885 | 8/1973 | Liebert et al. .............. | 422/189 X |
| 3,826,710 | 7/1974 | Anderson ................... | 423/DIG. 3 X |
| 3,849,536 | 11/1974 | Morgan ..................... | 162/30 R X |
| 3,960,507 | 6/1976 | Tsujikawa et al. ........... | 422/172 |
| 4,083,930 | 4/1978 | Kohl ........................ | 162/36 X |

*Primary Examiner*—Michael S. Marcus
*Attorney, Agent, or Firm*—Roylance, Abrams, Berdo & Farley

[57] ABSTRACT

A device for recovering chemicals from flue gases and green liquor obtained from burning the waste liquor of sodium based pulping processes, which device comprises a precarbonation reactor, a H₂S-stripping column, a carbonation reactor, a washing tower for flue gases and a cooling tower for washed flue gases, at least the carbonation reactor, the cooling tower and the washing tower being arranged on top of each other in the same column which is provided with trays so that means for feeding flue gases from the washing tower into the cooling tower and further into the carbonation reactor are openings made in the trays to allow the washed flue gases to rise from the washing tower into the cooling tower above it and further into the carbonation reactor above the cooling tower, common blower means for feeding flue gases into the washing tower for blowing flue gases through the washing tower, the cooling tower, the carbonation reactor and the precarbonation reactor and means for discharging a solution containing sodium carbonate and sodium bicarbonate from the stripping column being connected with means for feeding this solution directly into the carbonation reactor and the washing tower.

3 Claims, 1 Drawing Figure

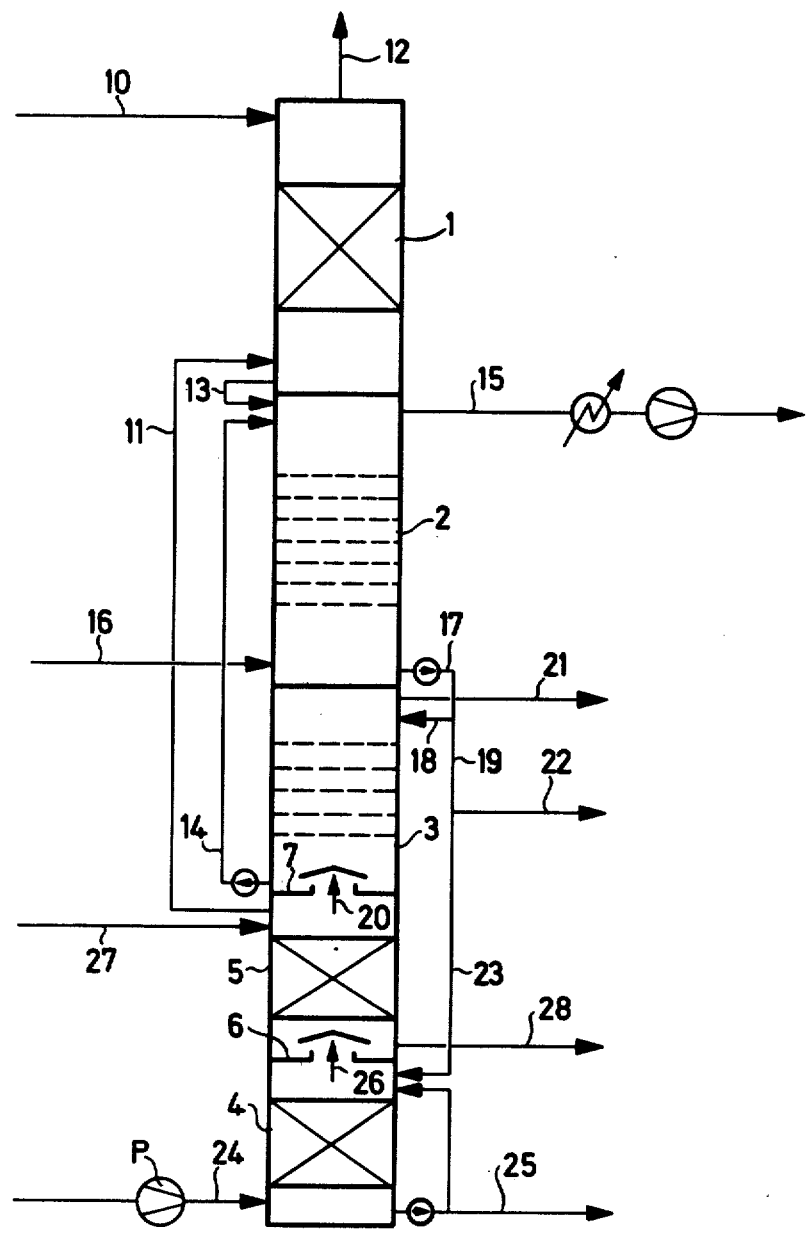

DEVICE FOR RECOVERING SODIUM CHEMICALS FROM GREEN LIQUOR AND FLUE GASES

BACKGROUND OF THE INVENTION

This invention relates to a device for recovering chemicals from flue gases and green liquor, i.e. the water solution of the smelt obtained from burning the waste liquor of sodium based pulping processes.

The waste liquor from sodium based sulfite cooking contains remarkable amounts of sodium chemicals, the recovery of which is profitable.

For this purpose the waste liquor has been concentrated by evaporating and burning in a recovery boiler. From the burning there have been obtained flue gases containing sulphur dioxide and carbon dioxide, and a smelt which is dissolved into water to form so-called green liquor which contains sodium sulfide. Sulphur dioxide has been washed out from the flue gases in a washer with a sodium carbonate solution made of green liquor. The sodium sulfite obtained can be used as such in sodium sulfite pulping.

The sodium carbonate solution has been obtained from green liquor by precarbonizing the green liquor first with washed and cooled flue gases, whereby sodium sulfide reacts with the carbon dioxide of the flue gases and sodium bisulfide is obtained.

Thereafter the precarbonated sodium bisulfide solution has been allowed to react with a sodium bicarbonate solution produced in the process, whereby the following reactions occur:

$$NaHS + NaHCO_3 \rightarrow H_2S + Na_2CO_3 \quad (1)$$

$$2NaHCO_3 \rightarrow CO_2 + H_2O + Na_2CO_3 \quad (2)$$

The first reaction (1) is desired; the competing reaction (2) tends to decrease the sodium bicarbonate content. Reaction (1) is more rapid and it produces hydrogen sulfide which is stripped by steam and burnt in a sulphur burner into sulphur dioxide which can be led together with other flue gases into the washer to produce sodium sulfite.

The amount of sodium bicarbonate used in the stripping stage is 1.4 to 1.7 times the equivalent amount to sodium bisulfide, whereby about 90 to 95% of the sulphur contained by the sodium sulfide of green liquor has been converted into hydrogen sulfide. Thus a minor amount of sodium bisulfide remains in the solution.

Thereafter the stripped solution has been taken into a crystallizer in which sodium carbonate and sodium bicarbonate have been crystallized from the solution. These crystals have then been dissolved in water and part of the solution thus obtained has been led into the flue gas washer where the sulphur dioxide of the flue gases reacts with sodium carbonate to produce sodium sulfite. Part of the solution has been led into a carbonation reactor where the sodium carbonate of the solution has been allowed to react with a large enough portion of the washed flue gases to increase the sodium bicarbonate content of the solution so much that when this solution is taken into the stripping stage, it contains sodium bicarbonate 1.4 to 1.7 times the equivalent amount to sodium bisulfide.

The object of this invention is to accomplish a simpler device than before for recovering chemicals from flue gases and water solution of the smelt obtained from burning the waste liquor of sodium based pulping processes.

SUMMARY OF THE INVENTION

According to the invention there is now provided a device in which at least the carbonation reactor, the cooling tower and the washing tower are arranged on top of each other in the same column which is provided with trays so that the means for feeding flue gases from the washing tower into the cooling tower and further into the carbonation reactor are openings made in the trays to allow the washed flue gases to rise from the washing tower into the cooling tower above it and further into the carbonation reactor above the cooling tower, the means for feeding flue gases into the washing tower comprise a common blower for blowing flue gases through washing tower, cooling tower, carbonation reactor and precarbonation reactor and the means for discharging the solution containing sodium carbonate and sodium bicarbonate from the stripping column are connected with means for feeding this solution directly into the carbonation reactor and the washing tower.

In the device according to the invention all units can thus be situated one upon the other in a column. The lowermost unit is a washer to which gases containing sulphur dioxide are taken in. On top of the washer there is a cooling tower and upon this there is a carbonation reactor into which the washed and cooled flue gases rise. The flue gases are taken from one unit up to the next one directly through the reactor trays between the units. The flue gases can be blown through the washer, cooling tower, carbonation reactor and precarbonation reactor by one single blower; earlier several blowers have been necessary.

The operation of the device according to the invention is thus simplier than before; its space requirement is lesser and investment costs lower because less linking equipment, pipings, pumps, tanks, and regulating devices are needed between the different units.

In the stripping column of the device according to the invention substantially all sodium bisulfide can be converted into sodium carbonate and hydrogen sulphide by bringing the precarbonated, sodium bisulfide containing solution in the stripping column in contact with a solution containing sodium bicarbonate at least twice, preferably, however, not over four times the equivalent amount of sodium bisulfide. The big extra amount of bicarbonate is necessary in order to make the H₂S-stripping as effective as possible so that the remaining liquor can be utilized in the carbonator and in the flue gas washer without any trouble caused by liberated hydrogen sulfide. Such sodium bicarbonate solution is prepared by feeding substantially all washed and cooled flue gases, except the flue gases possibly consumed in the precarbonation, into the carbonation reactor to which part of the stripped, sodium carbonate containing solution is returned in order to increase its sodium bicarbonate content. Because the solution leaving the stripping column does not contain any sodium bisulfide, it can be fed into the washer directly without any extra crystallizations. Thus the present device is simpler than the known devices.

Because no extra crystallizations of the stripped solution are needed in the present device and all flue gases are utilized in the same process, the device can be constructed simpler than before.

DESCRIPTION OF THE DRAWING

The accompanying FIGURE is a schematic vertical section view of the device according to the invention, in which device all units are in the same column on top of each other.

DESCRIPTION OF THE PREFERRED EMBODIMENT

When thick liquor is burnt in the recovery boiler, a smelt is obtained which is dissolved in water into green liquor. Dry solids are separated from the green liquor by clarifying. The clarified green liquor 10 is pumped into the uppermost part 1 of the column where it is treated with flue gases 11 according to the principle of countercurrent flow. The precarbonation stage 1 can be realized either according to the spraying-, packing piece- or tray reactor principle. The sodium sulfide of the green liquor reacts with the carbon dioxide of the flue gases and is partly or completely precarbonated into sodium hydrogen sulfide. The flue gas 12 of the precarbonation stage leaves the column from the upper end.

The partly or completely precarbonated green liquor 13 is led into the next unit 2 of the column where it is treated with a large extra amount (2 to 4 times the equivalent amount of the reaction) of sodium bicarbonate. The liberated hydrogen sulphide 15 is transferred from the liquid phase to the gas phase and out from the column by a transfer medium 16 being either steam, flue gas or some other inert gas. The separation 2 of hydrogen sulphide can be realized for example in the manner described in Finnish Pat. No. 37 470. The liquid 17 flowing out from the separation stage 2 contains mainly sodium carbonate and sodium bicarbonate and a minor amount of sodium sulfate and sodium thiosulfate. The sodium sulfide content is either nought or so small that it does not disturb further use of the solution in the process. The separated hydrogen sulphide gas 15 is transferred into further treatment, for example to be burnt in a sulphur burner.

The sodium carbonate - sodium bicarbonate flow 17 is divided into two flows 18 and 19. The flow 18 is led into the next column unit 3 where it is treated with flue gases 20 which have been cooled down to 20 to 40° C. The sodium carbonate reacts with the carbon dioxide of the flue gases and is converted into sodium bicarbonate. The mixture 14 of sodium bicarbonate and sodium carbonate is returned to the $H_2S$-separation stage 2. The flue gas 21 goes directly out of the column and the process. The carbonation stage 3 can be realized for example on reactor trays according to the principle of countercurrent flow.

The sodium carbonate-bicarbonate flow 19 is further divided into two flows 22 and 23. The flow 22 goes out of the column and the process, but the flow 23 is led into the flue gas washing stage 4. The carbon dioxide and/or sulphur dioxide containing gases 24 are led into the lowermost section of the column. The lowermost section of the column serves as flue gas washing stage 4, where mainly sulphur dioxide, sometimes also hydrogen sulphide, HCl and solid sodium sulfate is washed from the vent gases of the recovery boiler or other equipment. The washing in the column can take place in one or several phases either according to the principle of spraying, tray reactor or packing piece.

The liquid flow 25 leaving the washing stage 4 of the column is sodium sulfite solution which can be used either as such for sodium based sulfite pulping or for other purposes.

The gases 26 leaving the washing stage are led into the cooling stage 5 where they are cooled with water 27 according to the principle of countercurrent flow either by spraying or in a packing piece layer. The warm water 28 leaving stage 5 is led out of the process and it can be used for different purposes. The cooled flue gases are led in flows 11 and 20 further into precarbonation 1 and carbonation 3.

In the following the invention will be described by way of an example.

EXAMPLE

The recovery boiler discharges 12700 $Nm^3/h$ dry flue gases which contain 0.31% sulphur dioxide corresponding to 1.8 kmol/h, and 19.4% carbon dioxide corresponding to 110 kmol/h. The recovery boiler also discharges water solution of the smelt, green liquor, 4.3 $m^3/h$, concentration 180 g $Na_2O$ act/l, sulphidity 58%, corresponding to 5.4 kmol $Na_2CO_3/h$ and 7.4 kmol $Na_2S/h$.

The precarbonation of the said amount of green liquor in the reaction

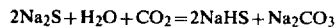
$$2Na_2S + H_2O + CO_2 = 2NaHS + Na_2CO_3$$

takes carbon dioxide $0.5 \times 7.4$ kmol/h = 3.7 kmol/h. Flue gas amount is 610 $Nm^3/h$ when the absorption degree of carbon dioxide is 70%.

The separation of hydrogen sulphide in the stripping stage

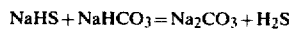
$$NaHS + NaHCO_3 = Na_2CO_3 + H_2S$$

takes sodium bicarbonate at least the equivalent amount in relation to sodium bisulfide, i.e. 7.4 kmol/h. However, the amount of bicarbonate actually used is more than equivalent in order to make the bisulfide to react into hydrogen sulphide as completely as possible. The bicarbonate is produced by the main flow of gases in the carbonation stage according to the reaction

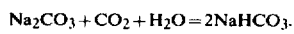
$$Na_2CO_3 + CO_2 + H_2O = 2NaHCO_3.$$

At carbon dioxide absorption degree of 6%, 6.3 kmol $CO_2/h$, corresponding to $2 \times 6.3$ kmol = 12.6 kmol bicarbonate/h, is absorbed in the carbonation. 11.7 kmol $Na_2CO_3/h$ and 2.2 kmol $NaHCO_3/h$ is taken from the stripping into the carbonation, whereby 14.8 kmol $NaHCO_3/h$ and 5.4 kmol $Na_2CO_3/h$ are taken from the carbonation into the separation of hydrogen sulphide.

In addition to the hydrogen sulphide main reaction, bicarbonate is consumed in the $H_2S$ separation also in the by reaction.

$$2NaHCO_3 = Na_2CO_3 + CO_2 + H_2O$$

corresponding to 1.5 kmol bicarbonate/h.

The extra amount 11.7 kmol $Na_2CO_3/h$ and 2.2 kmol $NaHCO_3/h$ is led from the $H_2S$ separation into the flue gas washer wherein the equivalent amount of sodium carbonate in relation to sulphur dioxide, i.e. 1.8 kmol/h is consumed in the reaction.

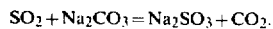
$$SO_2 + Na_2CO_3 = Na_2SO_3 + CO_2.$$

The washing stage of the column discharges a solution containing 9.9 kmol $Na_2CO_3$/h, 1.8 kmol $Na_2SO_3$/h and 2.2 kmol $NaHCO_3$.

What is claimed is:

1. In a device for recovering chemicals from flue gases and water solution of a smelt obtained from burning waste liquor of sodium based pulping processes, which device comprises: a precarbonation reactor; a $H_2S$ stripping column; a carbonation reactor; a washing tower for flue gases, a cooling tower for washed flue gases; means for feeding flue gases into the washing tower, from the washing tower into the cooling tower, and from the cooling tower into the carbonation reactor and the precarbonation reactor, and for feeding flue gases out of the precarbonation reactor and the carbonation reactor; means for feeding green liquor into the precarbonation reactor, for leading solution containing sodium bisulfide from the precarbonation reactor into the stripping column, and for discharging a solution containing sodium carbonate and sodium bicarbonate from the stripping column; means for feeding transfer gas into the stripping column and for discharging gaseous hydrogen sulphide from the stripping column; means for feeding cooling water into the cooling tower and for discharging warm water therefrom; means for feeding the solution containing sodium carbonate and sodium bicarbonate into the carbonation reactor and thereafter into the stripping column; means for feeding the solution containing sodium carbonate and sodium bicarbonate discharged from said stripping column into the washing tower and for discharging a sodium sulfite solution therefrom; the improvement: that at least the carbonation reactor, the cooling tower and the washing tower are arranged on top of each other in the same column which is provided with trays so that the means for feeding flue gases from the washing tower into the cooling tower and further into the carbonation reactor are openings made in the trays to allow the washed flue gases to rise from the washing tower into the cooling tower above it and further into the carbonation reactor above the cooling tower; that the means for feeding flue gases into the washing tower comprise a common blower for blowing flue gases through washing tower, cooling tower, carbonation reactor, and precarbonation reactor, and that the means for discharging the solution containing sodium carbonate and sodium bicarbonate from the stripping column are connected with means for feeding this solution directly into the carbonation reactor and the washing tower.

2. The device according to claim 1, in which also the stripping tower and the precarbonation reactor are on top of each other above the other units in the common column.

3. The device of claim 2, in which the precarbonation reactor is uppermost.

* * * * *